United States Patent
Shaffer et al.

(10) Patent No.: US 8,194,836 B2
(45) Date of Patent: Jun. 5, 2012

(54) ENHANCED EXTENSION MOBILITY

(75) Inventors: Shmuel Shaffer, Palo Alto, CA (US);
Labhesh Patel, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 2186 days.

(21) Appl. No.: 10/824,180

(22) Filed: Apr. 14, 2004

(65) Prior Publication Data
US 2005/0235158 A1    Oct. 20, 2005

(51) Int. Cl.
*H04M 3/42*    (2006.01)

(52) U.S. Cl. .................. 379/201.01; 379/168; 379/171; 379/265.04

(58) Field of Classification Search ............. 379/265.02, 379/168, 171, 184, 201.01, 265.01, 265.04; 713/184, 201; 370/270
See application file for complete search history.

(56) References Cited

U.S. PATENT DOCUMENTS

| | | | | |
|---|---|---|---|---|
| 5,090,052 | A * | 2/1992 | Nakajima et al. | 379/93.28 |
| 5,933,488 | A * | 8/1999 | Marcus et al. | 379/217.01 |
| 6,035,404 | A * | 3/2000 | Zhao | 726/6 |
| 6,292,792 | B1 * | 9/2001 | Baffes et al. | 706/45 |
| 6,577,726 | B1 * | 6/2003 | Huang et al. | 379/265.02 |
| 6,807,666 | B1 * | 10/2004 | Evans et al. | 718/108 |
| 7,127,044 | B1 * | 10/2006 | Becker et al. | 379/45 |
| 7,376,740 | B1 * | 5/2008 | Porter et al. | 709/227 |
| 2001/0033564 | A1 * | 10/2001 | Hickman | 370/352 |
| 2003/0126250 | A1 * | 7/2003 | Jhanji | 709/223 |
| 2004/0264665 | A1 * | 12/2004 | Idoni et al. | 379/201.01 |
| 2005/0096926 | A1 * | 5/2005 | Eaton et al. | 705/1 |
| 2005/0180555 | A1 * | 8/2005 | Sarp et al. | 379/220.01 |

FOREIGN PATENT DOCUMENTS

| | | | |
|---|---|---|---|
| GB | 2 361 831 | | 4/2000 |
| WO | WO 98/36602 | * | 8/1998 |
| WO | WO 2004/072859 A1 | * | 8/2004 |

OTHER PUBLICATIONS

Canadian Intellectual Property Office letter to Gowling LaFleur Henderson LLP re: Office Action for Canadian Patent Application No. 2,562,006, "Enhanced Extension Mobility", (Jan. 2006), forwarded by foreign associate to Baker Botts, (4 pgs), Jan. 28, 2010.

(Continued)

*Primary Examiner* — Ahmad Matar
*Assistant Examiner* — Khai N. Nguyen
(74) *Attorney, Agent, or Firm* — Baker Botts L.L.P.

(57) ABSTRACT

In one embodiment, a method for enhanced extension mobility includes accessing user input indicating either a desire of a user to logon at an endpoint in a private mode according to which the endpoint supports only an extension of the user or a desire of the user to logon at the endpoint in a shared mode according to which the endpoint concurrently supports an extension of the user and one or more other extensions of one or more other users. The method includes configuring the endpoint to support only an extension of the user if the user input indicates a desire of the user to logon at the endpoint in a private mode according to which the endpoint supports only an extension of the user. The method includes configuring the endpoint to concurrently support an extension of the user and one or more other extensions of one or more other users if the user input indicates a desire of the user to logon at the endpoint in a shared mode according to which the endpoint concurrently supports an extension of the user and one or more other extensions of one or more other users.

45 Claims, 2 Drawing Sheets

OTHER PUBLICATIONS

European Patent Office Communication dated Dec. 5, 2011 regarding Application No. 05729075.1-2414/1741218 PCT US 2005008871.

"HiPath Teleworking Solution Mobile Work," Internet Citation, Oct. 3, 2000, XP002299684, retrieved from the Internet: URL:http://www.etw.org/2000/html/Awards/Nominations (retrieved on Oct. 7, 2004).

* cited by examiner

ENHANCED EXTENSION MOBILITY

TECHNICAL FIELD OF THE INVENTION

This invention relates generally to communication networks and more particularly to enhanced extension mobility (EEM).

BACKGROUND

Extension mobility typically enables "hotelling," which typically allows a user to enter an office and configure a phone in that office to assume an extension and a default configuration of the user. Hotelling is often suitable for users who do not have assigned offices, but are free to use any of multiple offices in a one or more buildings. Hotelling may also provide logoff functionality that allows a user to prevent unauthorized persons (such as janitors) from placing outgoing phone calls.

SUMMARY OF THE INVENTION

According to the present invention, disadvantages and problems associated with extension mobility may be reduced or eliminated.

In one embodiment, a method for enhanced extension mobility includes accessing user input indicating either a desire of a user to logon at an endpoint in a private mode according to which the endpoint supports only an extension of the user or a desire of the user to logon at the endpoint in a shared mode according to which the endpoint concurrently supports an extension of the user and one or more other extensions of one or more other users. The method includes configuring the endpoint to support only an extension of the user if the user input indicates a desire of the user to logon at the endpoint in a private mode according to which the endpoint supports only an extension of the user. The method includes configuring the endpoint to concurrently support an extension of the user and one or more other extensions of one or more other users if the user input indicates a desire of the user to logon at the endpoint in a shared mode according to which the endpoint concurrently supports an extension of the user and one or more other extensions of one or more other users.

Particular embodiments of the present invention may provide one or more technical advantages. As an example, particular embodiments may enable two or more users to logon at a single endpoint so that the endpoint concurrently supports an extension of each of the users. Particular embodiments may enable two or more users to effectively share a single endpoint with each other. Particular embodiments enable two or more users to concurrently access extension-mobility functionality at a single endpoint. Particular embodiments may enhance a service level available to a user present at an endpoint other than a primary endpoint of the user (such as an endpoint in an office of the user). Particular embodiments enable two or more users to temporarily share a single endpoint (such as a phone) with each other. In particular embodiments, EEM functionality may include both previous extension-mobility functionality and additional functionality.

Certain embodiments may provide all, some, or none of these technical advantages. Certain embodiments may provide one or more other technical advantages, one or more of which may be readily apparent to those skilled in the art from the figures, descriptions, and claims herein.

BRIEF DESCRIPTION OF THE DRAWINGS

To provide a more complete understanding of the present invention and the features and advantages thereof, reference is made to the following description, taken in conjunction with the accompanying drawings, in which.

DESCRIPTION OF EXAMPLE EMBODIMENTS

Figure 1:
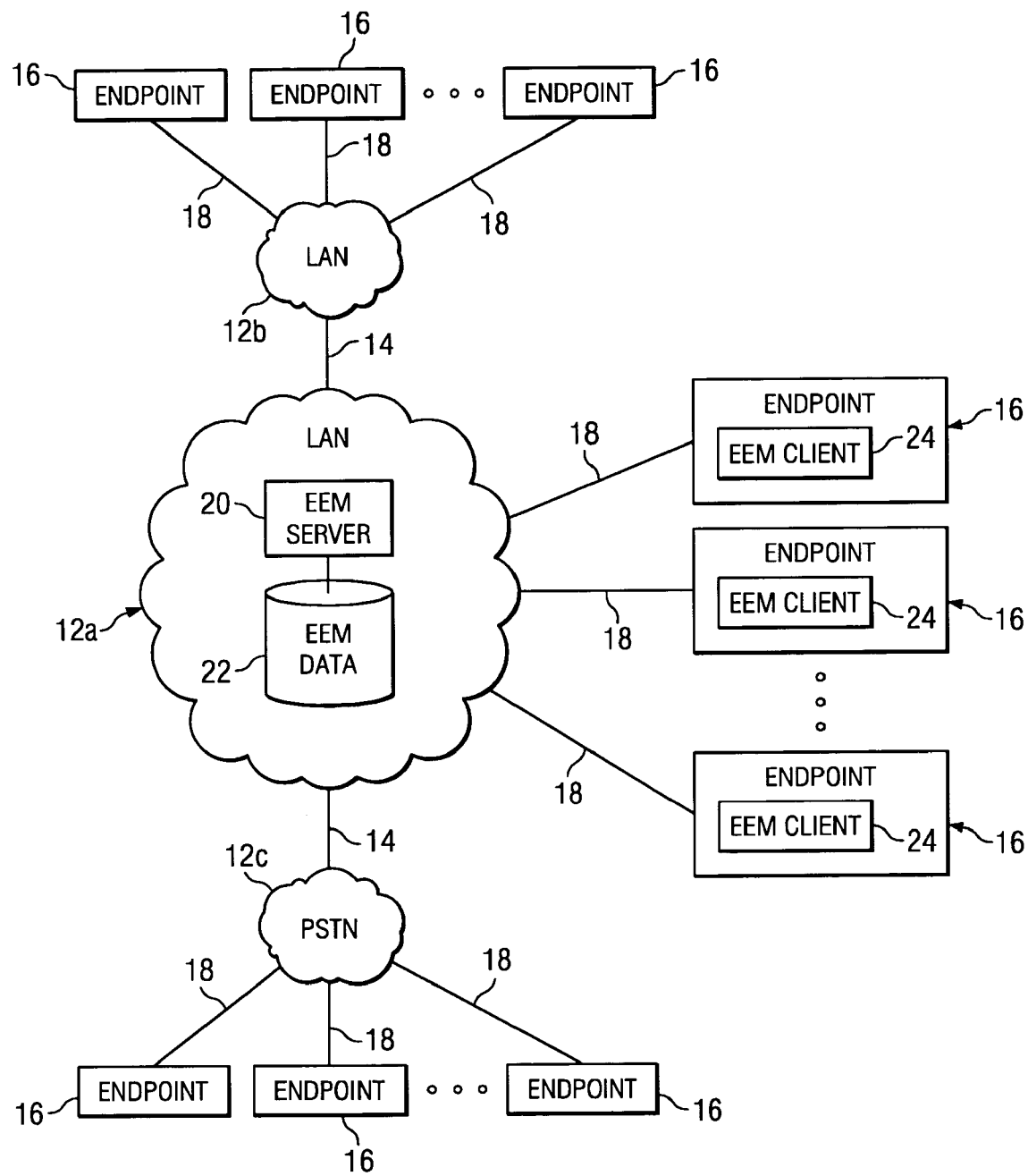
FIG. 1 illustrates an example system for EEM.

FIG. 1 illustrates an example system 10 for EEM in a communication network 12. Communication networks 12a and 12b are local area networks (LANs). Communication network 12c is a public switched telephone network (PSTN). Communication networks 12 are coupled to each other using network links 14 that may each include one or more LANs, wide area networks (WANs), metropolitan area networks (MANs), portions of the Internet, PSTNs, or other network links 14 or a combination of two or more such network links 14. In particular embodiments, a contact admission control (CAC) system is used to monitor bandwidth availability over a WAN coupling two or more communication networks 12 to each other. Although a particular number of particular communication networks 12 coupled to each other according to a particular arrangement are illustrated and described, the present invention contemplates any suitable number of any suitable communication networks 12 coupled to each other according to any suitable arrangement. Although communication networks 12 are illustrated and described as being more or less separate from each other, the present invention also contemplates two or more communication networks 12 being combined with each other in a suitable manner. In addition, a single communication network 12 may encompass multiple communication networks 12. As an example and not by way of limitation, in particular embodiments, a single communication network 12 includes communication networks 12a, 12b, and 12c and network links 14 coupling communication networks 12a, 12b, and 12c, to each other.

One or more portions of a communication network 12 may be associated with a particular enterprise or other organization. Another organization may operate one or more such portions of communication network 12 according to an outsourcing arrangement between the two organizations. In addition, one or more of portions of communication network 12 may include a private communication network 12, a virtual communication network 12, or both. One or more portions of communication network 12 may include one or more trust domains. One or more of portions of communication network 12 may be a distributed communication network 12.

A communication network 12 may include one or more network devices. A network device includes one or more hardware components, software components, or embedded-logic components or a combination of two or more such components supporting communication among multiple endpoints 16. As an example and not by way of limitation, a network device may include one or more network components, gatekeepers, contact managers, routers, hubs, switches, gateways, or endpoints 16 or a combination of two or more such devices. In particular embodiments, a network device may be an automatic contact distributor (ACD) coupled to one or more endpoints 16. An ACD includes a specialized communication system for routing incoming contacts to available agents at endpoints 16 coupled to the ACD. The ACD may route incoming contacts so that they are properly distributed among available agents. A contact includes a request for service communicated using any audio and/or video means, including signals, data or messages transmitted through voice devices, text chat, web sessions, facsimile, instant messaging and e-mail.

Network devices in a communication network 12 may be coupled to each other according to any suitable arrangement using one or more network segments. As an example and not by way of limitation, network devices in a communication network 12 may be coupled to each other according to a ring, mesh, or other topology using multiple network segments. A network segment may include one or more communication networks 12, computer buses, wireline segments, optical segments, wireless segments, or other segments or a combination of two or more of such segments. Although particular communication networks 12 including particular network devices coupled to each other according to particular arrangements using particular network segments are described, the present invention contemplates any suitable communication networks 12 including any suitable network devices coupled to each other according to any suitable arrangements using any suitable network segments.

Communication networks 12 each have endpoints 16. An endpoint 16 includes one or more hardware components, software components, or embedded-logic components or a combination of two or more such components for communicating with one or more other endpoints 16. As an example and not by way of limitation, an endpoint 16 may include a phone (which may be a mobile phone, a desktop phone, or another phone), a computer (which may be a laptop computer, a desktop computer, or other computer), a personal digital assistant (PDA), a video monitor, a camera, a fax machine, or other device. An endpoint 16 may be coupled to a network device in a communication network 12 using one or more endpoint links 18 that may each include one or more computer buses, LANs, MANs, WANs, or portions of the Internet or any other appropriate wireline, optical, wireless, or other endpoint links 18. Although endpoints 16 coupled to a communication network 12 are illustrated and described as being separate from communication network 12, communication network 12 may include one or more of endpoints 16. Endpoints 16 may communicate with each other using packets of data. A packet may include one or more packets, cells, frames, or other units of data. Data may include one or more data components, metadata components, executable software components, or other components.

Endpoints 16 may use one or more suitable communication protocols to communicate with each other. According to one or more such communication protocols, one or more endpoints 16 may each be identified using a unique address. In addition or as an alternative, one or more network devices may each be identified using a unique address. As an example and not by way of limitation, in particular embodiments, two or more endpoints 16 may each be identified by an Internet Protocol (IP) address and may communicate with each other using IP. In these embodiments, one or more components of system 10 may support point-to-point, multicast, unicast, or other communication. One or more endpoints 16 and network devices may support Voice over IP (VoIP) or Voice over Packet (VoP). To communicate using VoIP or VoP, an endpoint packetizes voice data into packets communicable over one or more packet-based communication networks 12. Endpoints 16 and network devices that may support VoIP or VoP include telephones, fax machines, computers running telephony software, nodes, gateways, and other devices capable of providing telephony functionality over a packet-based communication network 12.

Communication between a first endpoint 16 and one or more second endpoints 16 may include one or more voice components, text components, executable software components, data components, or other components or a combination of two or more such components. As an example and not by way of limitation, a communication between a first endpoint 16 and one or more second endpoints 16 may include one or more instant messages (IMs). One or more endpoints 16 and network devices may support use of Session Initiation Protocol (SIP) for IM and possibly other functionality. In addition or as an alternative, one or more endpoints 16 and network devices may support use of SIP for Instant Messaging and Presence-Leveraging Extensions (SIMPLE) Protocol. In system 10, one or more voice-enabled endpoints 16 may support use of SIP and presence-related applications. In addition or as a further alternative, one or more endpoints 16 and network devices may support use of Instant Messaging and Presence Protocol (IMPP). Reference to "IM" may encompass both IM and one or more IM-related protocols.

A communication network 12 may receive incoming phone calls from first endpoints 16 and route the incoming phone calls to second endpoints 16 coupled to communication network 12. Communication network 12 may route incoming phone calls according to calling phone numbers, called phone numbers, or both. An endpoint 16 may support an extension of a user. In particular embodiments, an extension includes a number or a series of numbers corresponding to a first user. One or more second users may use the extension to contact the first user. Communication network 12 may provide extension mobility or similar functionality enabling "hotelling" or a similar feature. Such functionality may allow a user to logon at a first endpoint 16 so that first endpoint 16 supports an extension of the first user and then log off at first endpoint 16. The user may then logon at a second endpoint 16 so that second endpoint 16 supports the extension of the user, which may provide mobility to the user in communication network 12. In particular embodiments, a user may be concurrently logged on at multiple endpoints 16.

Communication network 12a includes an EEM server 20 and EEM data 22. EEM server 20 may interact with EEM clients 24 at endpoints 16 coupled to communication network 12a to provide EEM functionality to endpoints 16, as described below. EEM server 20 and EEM clients 24 may use EEM data 22 to provide such functionality, as described below. Although EEM server 20 is illustrated and described as providing EEM functionality to endpoints 16 coupled to communication network 12a, the present invention contemplates server 20 providing EEM functionality to any suitable endpoints 16 coupled to any suitable communication networks 12. EEM client 24 may be either a thin (browser based) or a thick client. As an example and not by way of limitation, EEM server 20 may provide EEM functionality to endpoints 16 coupled communication network 12a, endpoints 16 coupled communication network 12b, and endpoints 16 coupled communication network 12c. In addition, although endpoints 16 coupled to communication network 12a are illustrated and described as including EEM clients 24, the present invention contemplates any suitable endpoints 16 coupled to any suitable communication networks 12 including EEM clients 24. As an example and not by way of limitation, endpoints 16 coupled communication network 12a, endpoints 16 coupled communication network 12b, and endpoints 16 coupled communication network 12c may include EEM clients 24.

An EEM client 24 at an endpoint 16 includes one or more hardware components, software components, or embedded logic components or a combination of two or more such components providing EEM functionality at endpoint 16, as described below. An endpoint 16 including an EEM client 24 may have a private mode and a shared mode. In private mode, endpoint 16 supports only one extension. In shared mode, endpoint 16 concurrently supports multiple extensions. An endpoint 16 may receive an incoming phone call that has a called extension corresponding to an extension supported at endpoint 16 and, in response to receiving the incoming phone call, prompt a called user of the incoming phone call to answer the incoming phone call. In particular embodiments, in private mode, endpoint 16 may receive the incoming phone call only if the called extension corresponds to the one extension supported at endpoint 16. Because endpoint 16 supports only one extension in private mode, endpoint 16 need not (but may nonetheless) identify the called extension when endpoint 16 prompts the called user to answer the incoming phone call.

In particular embodiments, in shared mode, endpoint 16 may receive the incoming phone call if the called extension corresponds to any one of the multiple extensions supported at endpoint 16. Because endpoint 16 supports multiple extensions in shared mode, endpoint 16 may identify the called extension when endpoint 16 prompts the called user to answer the incoming phone call. As an example and not by way of limitation, endpoint 16 may display the called extension, a name of the called user, or both at a display screen of endpoint 16. As another example, endpoint 16 may audibly announce a name of the called user between rings. In particular embodiments, endpoint 16 may access a .wav or similar file to audibly announce a name of a user. The .wav or similar file may be stored in a field (such as a UserName field) in a directory in EEM data 22 and downloaded to endpoint 16 when the user logs on at endpoint 16. As another example, endpoint 16 may play a unique ring tone that identifies the called user. In particular embodiments, when a user logs on at endpoint 16, endpoint 16 may present a unique ring tone to the user so that the user will later be able to identify incoming phone calls for the user. In particular embodiments, the user may select the unique ring tone at logon.

When an outgoing phone call is placed from an endpoint 16, endpoint 16 may generate signaling data identifying a calling extension of the outgoing phone call, a calling user of the outgoing phone call, or both for communication with the outgoing phone call. In particular embodiments, in private mode, endpoint 16 may generate the signaling data according to the one extension supported at endpoint 16. In particular embodiments, in shared mode, endpoint 16 may generate the signaling data according to user input specifically identifying the calling extension. As an example and not by way of limitation, when the outgoing phone call is placed, the calling user may press a button at endpoint 16 specifically identifying the calling user. As another example, when the outgoing phone call is placed, endpoint 16 may prompt the calling user to identify the calling user. To prompt the calling user to identify the calling user, endpoint 16 may audibly announce the following menu options: "Press 1 if you are Joe. Press 2 if you are Mark." The calling user may then select the menu option corresponding to the calling user to identify the calling user. In particular embodiments, when endpoint 16 receives user input identifying the calling user, endpoint 16 may present a dial tone for placing the outgoing phone call. In particular embodiments, in private mode, endpoint 16 may generate the signaling data according to a predetermined extension. As an example and not by way of limitation, endpoint 16 may be configured so that, in shared mode, endpoint 16 generates signaling data for every outgoing phone call placed at endpoint 16 according to an extension of an owner of endpoint 16. Endpoint 16 may be located in an office of the owner of endpoint 16.

An endpoint 16 may assume one or more preferences of a user whose extension is supported at endpoint 16. To assume a preference of a user, endpoint 16 may download the preference from a profile of the user in EEM data 22 when the user logs on at endpoint 16. In particular embodiments, in private mode, endpoint 16 may assume all preferences of the one user whose extension is supported at endpoint 16. In particular embodiments, in shared mode, endpoint 16 may assume one or more preferences of one or more of the multiple users whose extensions are supported at endpoint 16. When endpoint 16 receives an incoming phone call that has a called extension corresponding to an extension of a user supported at endpoint 16, endpoint 16 may exhibit one or more preferences of that user with respect to the incoming phone call. Similarly, when a user whose extension is supported at endpoint 16 places an outgoing phone call, endpoint 16 may exhibit one or more preferences of that user with respect to the outgoing phone call. In particular embodiments, in shared mode, endpoint 16 may assume one or more preferences of only one user whose extension is supported at endpoint 16. As an example and not by way of limitation, endpoint 16 may be configured so that, in shared mode, endpoint 16 assumes all preferences of an owner of endpoint 16 and no preferences of any other user. In particular embodiments, when a user whose extension is supported at endpoint 16 places an outgoing phone call, call detail records (CDRs) and billing information may be updated to indicate that the user made the outgoing phone call. The CDRs and billing information may be stored at EEM data 22 or elsewhere, according to particular needs.

To access EEM functionality at an endpoint 16, a user may invoke an EEM client 24 at endpoint 16. As an example and not by way of limitation, to invoke EEM client 24, the user presses a button at endpoint 16 invoking EEM client 24. When the user invokes EEM client 24, EEM client 24 may cause endpoint 16 to provide a logon menu to the user. In particular embodiments, endpoint 16 displays the logon menu at a display screen of endpoint 16. The logon menu may prompt the user to identify the user, provide a valid password, or both to logon at endpoint 16. In particular embodiments, the logon menu prompts the user to enter an extension of the user and a password corresponding to that extension. If the user enters a valid extension and a valid password corresponding to that extension, EEM client 24 may cause endpoint 16 to provide the following menu option to the user: "Enter 1 to logon in private mode. Enter 2 to logon in shared mode." If the user selects private mode, EEM client 24 may configure endpoint 16 to support only the extension entered by the user, as described above. If the user selects shared mode, EEM client 24 may configure endpoint 16 to support the extension entered by the user in addition to one or more other extensions already supported at endpoint 16, as described above. To configure endpoint 16 to support the extension entered by the user, EEM client 24 may establish one or more new lines or other connections at endpoint 16 for the extension entered by the user. EEM client 24 may communicate with EEM server 20 to establish the one or more new lines or other connections at endpoint 16. In addition, EEM client 24 may communicate with EEM server 20 to access EEM data 22, as described above.

Although an EEM client 24 is illustrated and described as being a component of an endpoint 16, EEM client 24 may reside outside endpoint 16 in particular embodiments. In addition or as an alternative to EEM client 24 residing outside endpoint 16, EEM client 24 may be a component of a shared workstation used by multiple users.

Figure 2:
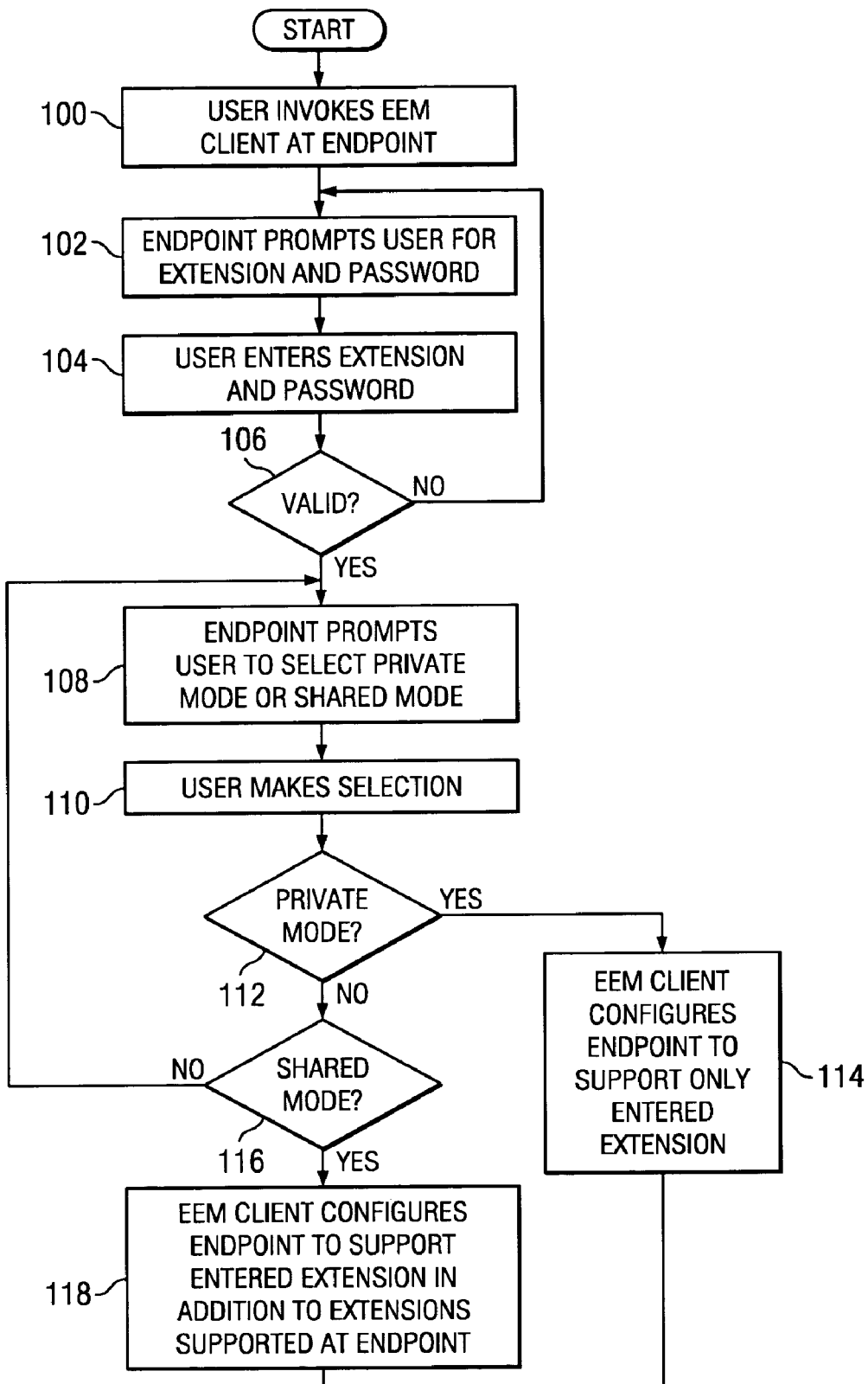
FIG. 2 illustrates an example method for EEM.

FIG. 2 illustrates an example method for EEM. The method begins at step 100, where a user invokes an EEM client 24 at an endpoint 16. At step 102, endpoint 16 prompts the user to enter an extension and a password. At step 104, the user enters an extension and a password. At step 106, endpoint 16 determines whether the extension and the password are valid. If the extension or the password is invalid, the method returns to step 102. If the extension and the password are valid, the method proceeds to step 108, where endpoint 16 prompts the user to select private mode or shared mode. At step 110, the user selects private mode or shared mode. At step 112, endpoint 16 determines whether the user selected private mode. If the user selected private mode, the method proceeds to step 114. At step 114, EEM client 24 configures endpoint 16 to support only the extension entered by the user at step 104, at which point the method ends. Returning to step 112, if the user did not select private mode, the method proceeds to step 116. At step 116, endpoint 16 determines whether the user selected shared mode. If the user selected shared mode, the method proceeds to step 118, where EEM client 24 configures endpoint 16 to support the extension entered by the user at step 104 in addition to one or more other extensions of one or more other users already supported at endpoint 16, at which point the method ends. Returning to step 116, if the user did not select shared mode, the method returns to step 108. Although the steps of the method illustrated in FIG. 2 are described and illustrated as occurring in a particular order, the present invention contemplates any suitable steps of the method illustrated in FIG. 2 occurring in any suitable order.

Although the present invention has been described with several embodiments, myriad changes, variations, alterations, transformations, and modifications may be suggested to one skilled in the art, and it is intended that the present invention encompass such changes, variations, alterations, transformations, and modifications as fall within the scope of the appended claims. The present invention is not intended to be limited, in any way, by any statement in the specification that is not reflected in the claims.

What is claimed is:

1. A system for enhanced extension mobility, the system comprising one or more processing units collectively operable to:
   access user input indicating a desire of the user to logon at a telephone in a shared mode according to which the telephone concurrently supports a telephone extension of the user and one or more other telephone extensions of one or more other users; and
   in response to the user input indicating a desire of the user to logon at the telephone in a shared mode according to which the telephone concurrently supports the telephone extension of the user and one or more other telephone extensions of one or more other users, configure the telephone to concurrently support the telephone extension of the user and one or more other telephone extensions of one or more other users.

2. The system of claim 1, wherein one or more of the processing units are located at the telephone.

3. The system of claim 1, wherein one or more of the processing units are located at a server remote from the telephone.

4. The system of claim 1, wherein the one or more processing units are operable to:
   prompt the user to select between a private mode and the shared mode at the telephone; and
   receive a selection by the user of shared mode at the telephone, the selection providing the accessed user input.

5. The system of claim 1, wherein the one or more processing units are operable to:
   prompt the user to enter the telephone extension of the user to logon at the telephone;
   access the telephone extension entered by the user; and
   configure the telephone to support the entered telephone extension.

6. The system of claim 5, wherein the one or more processing units are operable to:
   prompt the user to enter a password to logon at the telephone;
   access a password entered by the user;
   determine whether the entered password is valid; and
   if the entered password is valid, configure the telephone to support the entered telephone extension.

7. The system of claim 1, wherein the one or more processing units are further operable, in response to an incoming phone call for the user received at the telephone, to indicate the telephone extension of the user.

8. The system of claim 7, wherein the one or more processing units are operable to display the telephone extension of the user at a display screen of the telephone to indicate the phone call for the user.

9. The system of claim 7, wherein the one or more processing units are operable to audibly announce a name of the user to indicate the phone call for the user.

10. The system of claim 7, wherein the one or more processing units are operable to play a ring tone corresponding to the telephone extension of the user to indicate the phone call for the user.

11. The system of claim 1, wherein the one or more processing units are further operable, in response to a request from the user to place an outgoing phone call from the telephone, to:
    prompt the user to enter the telephone extension of the user prior to placing the outgoing phone call from the telephone; and
    generate signaling data for communication with the outgoing phone call that identifies the entered telephone extension of the user.

12. The system of claim 1, wherein the one or more processing units are further operable to generate signaling data for communication with every outgoing phone call from the telephone according to a predetermined telephone extension.

13. The system of claim 1, wherein the one or more processing units are operable to:
    access user input indicating a desire of a user to logon at the telephone in a private mode according to which the telephone supports only the telephone extension of the user, wherein the user can be concurrently logged on at multiple telephones; and
    in response to the user input indicating a desire of the user to logon at the telephone in a private mode according to which the telephone supports only the telephone extension of the user, configure the telephone to support only the telephone extension of the user.

14. The system of claim 13, wherein the one or more processing units are further operable, in response to the user input indicating a desire of the user to logon at the telephone in a private mode according to which the telephone supports only the telephone extension of the user, to configure the telephone according to one or more preferences of the user.

15. The system of claim 1, wherein the one or more processing units are further operable, in response to an outgoing phone call from the telephone, to cause one or more of one or more call detail records (CDRs) and one or more billing records to be updated to indicate a calling telephone extension of the outgoing phone call from the telephone.

16. A method for enhanced extension mobility, the method comprising:
    accessing user input indicating a desire of the user to logon at a telephone in a shared mode according to which the telephone concurrently supports a telephone extension of the user and one or more other telephone extensions of one or more other users; and in response to the user input indicating a desire of the user to logon at the telephone in a shared mode according to which the telephone concurrently supports the telephone extension of the user and one or more other telephone extensions of one or more other users, configuring the telephone to concurrently support the telephone extension of the user and one or more other telephone extensions of one or more other users.

17. The method of claim 16, comprising:
prompting the user to select between a private mode and the shared mode at the telephone; and
receiving a selection by the user of shared mode at the telephone, the selection providing the accessed user input.

18. The method of claim 16, comprising:
prompting the user to enter the telephone extension of the user to logon at the telephone;
accessing the telephone extension entered by the user; and
configuring the telephone to support the entered telephone extension.

19. The method of claim 18, comprising:
prompting the user to enter a password to logon at the telephone;
accessing a password entered by the user;
determining whether the entered password is valid; and
configuring the telephone to support the entered telephone extension only if the entered password is valid.

20. The method of claim 16, further comprising, in response to an incoming phone call for the user received at the telephone, indicating the telephone extension of the user.

21. The method of claim 20, comprising displaying the telephone extension of the user at a display screen of the telephone to indicate the phone call for the user.

22. The method of claim 20, comprising audibly announcing a name of the user to indicate the phone call for the user.

23. The method of claim 20, comprising playing a ring tone corresponding to the telephone extension of the user to indicate the phone call for the user.

24. The method of claim 16, wherein, in response to a request from the user to place an outgoing phone call from the telephone, the method further comprises:
prompting the user to enter the telephone extension of the user prior to placing an outgoing phone call from the telephone; and
generating signaling data for communication with the outgoing phone call that identifies the entered telephone extension of the user.

25. The method of claim 16, comprising generating signaling data for communication with every outgoing phone call from the telephone according to a predetermined telephone extension.

26. The method of claim 16, comprising:
accessing user input indicating a desire of a user to logon at the telephone in a private mode according to which the telephone supports only the telephone extension of the user, wherein the user can be concurrently logged on at multiple telephones; and
in response to the user input indicating a desire of the user to logon at the telephone in a private mode according to which the telephone supports only the telephone extension of the user, configuring the telephone to support only the telephone extension of the user.

27. The method of claim 26, comprising, in response to the user input indicating a desire of the user to logon at the telephone in a private mode according to which the telephone supports only the telephone extension of the user, configuring the telephone according to one or more preferences of the user.

28. The method of claim 16, further comprising, in response to an outgoing phone call from the telephone, causing one or more of one or more call detail records (CDRs) and one or more billing records to be updated to indicate a calling telephone extension of the outgoing phone call from the telephone.

29. A computer-readable medium encoded with logic for enhanced extension mobility, the logic when executed operable to:
access user input indicating a desire of the user to logon at a telephone in a shared mode according to which the telephone concurrently supports a telephone extension of the user and one or more other telephone extensions of one or more other users; and
in response to the user input indicating a desire of the user to logon at the telephone in a shared mode according to which the telephone concurrently supports the telephone extension of the user and one or more other telephone extensions of one or more other users, configure the telephone to concurrently support the telephone extension of the user and one or more other telephone extensions of one or more other users.

30. The computer-readable medium of claim 29, being at least partly located at the telephone.

31. The computer-readable medium of claim 29, being at least partly located at a server remote from the telephone.

32. The computer-readable medium of claim 29, wherein the logic is operable to prompt the user to select between private mode and shared mode at the telephone, the selection by the user providing the user input.

33. The computer-readable medium of claim 29, wherein the logic is operable to:
prompt the user to enter the telephone extension of the user to logon at the telephone;
access the telephone extension entered by the user; and
configure the telephone to support the entered telephone extension.

34. The computer-readable medium of claim 33, wherein the logic is operable to:
prompt the user to enter a password to logon at the telephone;
access a password entered by the user;
determine whether the entered password is valid; and
if the entered password is valid, configure the telephone to support the entered telephone extension.

35. The computer-readable medium of claim 29, wherein the logic is further operable, in response to an incoming phone call for the user received at the telephone, to indicate the telephone extension of the user.

36. The computer-readable medium of claim 35, wherein the logic is operable to display the telephone extension of the user at a display screen of the telephone to indicate the phone call for the user.

37. The computer-readable medium of claim 35, wherein the logic is operable to audibly announce a name of the user to indicate the phone call for the user.

38. The computer-readable medium of claim 35, wherein the logic is operable to play a ring tone corresponding to the telephone extension of the user to indicate the phone call for the user.

39. The computer-readable medium of claim 29, wherein the logic is further operable to:

prompt the user to enter the telephone extension of the user prior to placing an outgoing phone call from the telephone; and generate signaling data for communication with the outgoing phone call that identifies the entered telephone extension of the user.

40. The computer-readable medium of claim 29, wherein the logic is further operable to generate signaling data for communication with every outgoing phone call from the telephone according to a predetermined telephone extension.

41. The computer-readable medium of claim 29, wherein the logic is further operable to:

access user input indicating a desire of a user to logon at the telephone in a private mode according to which the telephone supports only the telephone extension of the user, wherein the user can be concurrently logged on at multiple telephones; and in response to the user input indicating a desire of the user to logon at the telephone in a private mode according to which the telephone supports only the telephone extension of the user, configure the telephone to support only the telephone extension of the user.

42. The computer-readable medium of claim 41, wherein the logic is further operable, in response to accessing the user input indicating a desire of the user to logon at the telephone in a private mode according to which the telephone supports only the telephone extension of the user, to configure the telephone according to one or more preferences of the user.

43. The computer-readable medium of claim 29, wherein the logic is further operable, in response to an outgoing phone call from the telephone, to cause one or more of one or more call detail records (CDRs) and one or more billing records to be updated to indicate a calling telephone extension of the outgoing phone call from the telephone.

44. A system for enhanced extension mobility, the system comprising:

means for accessing user input indicating a desire of the user to logon at in a shared mode according to which the telephone concurrently supports a telephone extension of the user and one or more other telephone extensions of one or more other users; and in response to the user input indicating a desire of the user to logon at the telephone in a shared mode according to which the telephone concurrently supports the telephone extension of the user and one or more other telephone extensions of one or more other users, means for configuring the telephone to concurrently support the telephone extension of the user and one or more other telephone extensions of one or more other users.

45. A system for enhanced extension mobility, the system comprising one or more processing units located at a telephone and collectively operable to:

access user input indicating a desire of the user to logon at the in a shared mode according to which the telephone concurrently supports a telephone extension of the user and one or more other telephone extensions of one or more other users; and in response to the user input indicating a desire of the user to logon at the telephone in a shared mode according to which the telephone concurrently supports the telephone extension of the user and one or more other telephone extensions of one or more other users, configure the telephone to concurrently support the telephone extension of the user and one or more other telephone extensions of one or more other users;

in response to an incoming phone call for the user received at the telephone, indicate the telephone extension of the user;

in response to a request from the user to place an outgoing phone call from the telephone:

prompt the user to enter the telephone extension of the user prior to placing an outgoing phone call from the telephone; and generate signaling data for communication with the outgoing phone call that identifies the entered telephone extension of the user.

* * * * *